United States Patent
Lyle et al.

(10) Patent No.: US 7,877,443 B2
(45) Date of Patent: Jan. 25, 2011

(54) METHOD, SYSTEM, AND COMPUTER PROGRAM PRODUCT FOR WEB CONFERENCE PARTICIPANT DISPLAY RENDER ACKNOWLEDGEMENT

(75) Inventors: Ruthie D. Lyle, Durham, NC (US); Fonda Daniels, Cary, NC (US); Arthur R. Francis, Raleigh, NC (US); Martin J. Presler-Marshall, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 11/127,377

(22) Filed: May 12, 2005

(65) Prior Publication Data
US 2006/0271624 A1 Nov. 30, 2006

(51) Int. Cl.
*G06F 15/16* (2006.01)
(52) U.S. Cl. .................. 709/204; 709/205; 709/206; 709/207; 715/748; 715/751; 715/753
(58) Field of Classification Search .................. 709/204
See application file for complete search history.

(56) References Cited

U.S. PATENT DOCUMENTS

| | | | | |
|---|---|---|---|---|
| 5,596,362 | A * | 1/1997 | Zhou ....................... 348/14.01 |
| 6,199,101 | B1 * | 3/2001 | Pfaff ........................... 709/204 |
| 6,343,313 | B1 * | 1/2002 | Salesky et al. .............. 709/204 |
| 6,865,264 | B2 * | 3/2005 | Berstis .................. 379/202.01 |
| 7,003,550 | B1 * | 2/2006 | Cleasby et al. ............. 709/205 |
| 7,069,515 | B1 * | 6/2006 | Eagle et al. ................. 715/747 |
| 7,107,307 | B1 * | 9/2006 | Takishita .................... 709/203 |
| 7,283,970 | B2 * | 10/2007 | Cragun et al. .................. 705/8 |
| 7,567,987 | B2 * | 7/2009 | Shappell et al. ............. 707/201 |
| 2002/0101445 | A1 * | 8/2002 | Berque ....................... 345/751 |
| 2003/0012348 | A1 * | 1/2003 | Skladman et al. ........ 379/88.13 |
| 2003/0018778 | A1 * | 1/2003 | Martin et al. ............... 709/224 |
| 2003/0023712 | A1 * | 1/2003 | Zhao et al. ................... 709/223 |
| 2004/0013136 | A1 * | 1/2004 | Mailhot et al. ............. 370/537 |
| 2004/0024890 | A1 * | 2/2004 | Baek et al. .................. 709/229 |
| 2004/0253991 | A1 | 12/2004 | Azuma |
| 2004/0255308 | A1 * | 12/2004 | Leban et al. ................ 719/328 |
| 2005/0165859 | A1 * | 7/2005 | Geyer et al. ................. 707/201 |
| 2006/0002315 | A1 * | 1/2006 | Theurer et al. .............. 370/261 |
| 2006/0045029 | A1 * | 3/2006 | Ethier et al. ................ 370/260 |
| 2006/0242587 | A1 * | 10/2006 | Eagle et al. ................. 715/747 |
| 2007/0242129 | A1 * | 10/2007 | Ferren et al. ............. 348/14.01 |
| 2008/0133663 | A1 * | 6/2008 | Lentz ......................... 709/204 |
| 2008/0141144 | A1 * | 6/2008 | Muller et al. ............... 715/751 |

OTHER PUBLICATIONS

Suzuki et al., "Multimedia Local Conference System", Technical Disclosure Bulletin No. 7, vol. 37, pp. 415-416, Jul. 1994.

* cited by examiner

*Primary Examiner*—Kevin Bates
*Assistant Examiner*—Marcus McKenzie
(74) *Attorney, Agent, or Firm*—Ayla A. Lari; Hoffman Warnick LLC

(57) ABSTRACT

The present invention provides a method, system, and computer program product for web conference participant display render acknowledgment. The method comprises: providing shared information to at least one participant of a web conference; determining a screen rendering status of the shared information in a web browser of each participant of the web conference; obtaining the screen rendering status of the shared information from each participant; and displaying information regarding the screen rendering status of the shared information to a moderator of the web conference.

26 Claims, 6 Drawing Sheets

FIG. 4

| Participant/Location | Successful | In Progress | Stalled |
|---|---|---|---|
| Lyle/Site A | YES | -- | -- |
| Smith/Site B | YES | -- | -- |
| Jones/Site C | -- | YES | -- |
| Austin/Site D | -- | -- | YES |

FIG. 5

| Participant/Location | Successful | In Progress | Stalled |
|---|---|---|---|
| Lyle/Site A | YES | -- | -- |
| Smith/Site B | YES | -- | -- |
| Jones/Site C | YES | -- | -- |
| Austin/Site D | YES | -- | -- |

| 300 Participants | % Successful | % In Progress | %Stalled |
|---|---|---|---|
| 150 in Raleigh | 100 | -- | -- |
| 100 in Cambridge | 75 | 25 | -- |
| 50 in Endicott | 50 | 25 | 25 |

FIG. 6

| 300 Participants | % Successful | % In Progress | %Stalled |
|---|---|---|---|
| 150 in Raleigh | 100 | -- | -- |
| 100 in Cambridge | 75 | 25 | -- |
| 50 in Endicott | 50 | 25 | 25 |
| 20 Managers | 60 | 30 | 10 |

FIG. 7

METHOD, SYSTEM, AND COMPUTER PROGRAM PRODUCT FOR WEB CONFERENCE PARTICIPANT DISPLAY RENDER ACKNOWLEDGEMENT

BACKGROUND OF THE INVENTION

1. Field of the Invention

The present invention generally relates to web conferences. More particularly, the present invention provides a method, system, and computer program product for web conference participant display render acknowledgment.

2. Related Art

A web conference is an online meeting in which a moderator of the meeting shares a real-time view of his/her computer screen with remote meeting participants. Web conferences are often used to facilitate the demonstration of new software, to give a web seminar, or to facilitate a variety of other types of presentations over the Internet. A web conference provides a "visual communication" and is often used in conjunction with a telephone service (e.g., a conference call) for audio support.

The meeting moderator connects, most often using a browser, to a web conferencing server (WCS). The WCS allows the moderator the ability to share the real-time view of a particular application or an entire desktop screen with meeting participants. Similarly, each meeting participant accesses a WCS to view the shared content via a web browser on his/her machine. An illustrative web conferencing system 10 for providing a web conference is provided in FIG. 1. In this example, the web conference comprises a moderator and three meeting participants.

The web conferencing system 10 depicted in FIG. 1 generally includes a plurality of computing clients 12A-12D, each running a web browser 14, that a moderator 16 and one or more meeting participants 18A-18C use to connect to web conference servers (WCS) 20A-20C in a web conference network 22. In this example, the computing client 12A of the moderator 16 communicates with WCS 20A, the computing clients 12B and 12C of meeting participants 18A and 18B communicate with WCS 20B, and the computing client 12D of meeting participant 18C communicates with WCS 20C. It is possible, however, for the moderator 16 and all meeting participants 18 to be served by a single WCS.

Because the shared content is generally transferred from the computing client 12A of the moderator 16 to the web conference network 22 over a first network link, and from the web conference network 22 to the computing clients 12B-12D of the meeting participants 18A-18C over different network links, delays are inevitably introduced. These delays are a function of the speed and reliability of the respective network links and affect the speed at which the shared content is rendered by the browser 14 running on the computing client 12B-12D of each meeting participant 18A-18C.

Because of such network delays, the moderator 16 is never exactly sure of when the shared content they are presenting has been successfully rendered by the browser 14 running on the computing client 12B-12D of each meeting participant 18A-18C. That is, the moderator 16 does not know when each meeting participant 18A-18C actually sees the shared content communicated by the moderator 16.

To understand what the meeting participants 18A-18C are actually seeing at any given time, the moderator 16 might verbally ask the meeting participants 18A-18C (e.g., via an ongoing conference call), "Has your screen successfully rendered?," and wait for the meeting participants 18A-18C to respond. Likewise, a meeting participant 18A-18C might interrupt the presentation (e.g., via an ongoing conference call) to verbally inform the moderator 16, "Please wait, my screen has not successfully rendered." For web conferences with a large number of meeting participants, this quickly can become a significant problem.

SUMMARY OF THE INVENTION

The present invention provides a method, system, and computer program product for web conference participant display render acknowledgment. In particular, the present invention provides the moderator of a web conference with a visual representation of the render status for each meeting participant. Using this render status information, the moderator can more easily gauge the appropriate flow of the presentation by waiting, if deemed appropriate, for the successful rendering of shared content on meeting participants' browsers.

A first aspect of the present invention is directed to a method for providing screen rendering status information to a moderator of a web conference, comprising: providing shared information to at least one participant of the web conference; determining a screen rendering status of the shared information in a web browser of each participant of the web conference; obtaining the screen rendering status of the shared information from each participant; and displaying information regarding the screen rendering status of the shared information to the moderator of the web conference.

A second aspect of the present invention is directed to a system for providing screen rendering status information to a moderator of a web conference, comprising: a system for providing shared information to at least one participant of the web conference; a system for determining a screen rendering status of the shared information in a web browser of each participant of the web conference; a system for obtaining the screen rendering status of the shared information from each participant; and a system for displaying information regarding the screen rendering status of the shared information to the moderator of the web conference.

A third aspect of the present invention is directed to a program product stored on a computer readable medium for providing screen rendering status information to a moderator of a web conference, the computer readable medium comprising program code for performing the following steps: providing shared information to at least one participant of the web conference; determining a screen rendering status of the shared information in a web browser of each participant of the web conference; obtaining the screen rendering status of the shared information from each participant; and displaying information regarding the screen rendering status of the shared information to the moderator of the web conference.

A fourth aspect of the present invention provides a method for deploying an application for providing screen rendering status information to a moderator of a web conference, comprising: providing a computer infrastructure being operable to: provide shared information to at least one participant of the web conference; determine a screen rendering status of the shared information in a web browser of each participant of the web conference; obtain the screen rendering status of the shared information from each participant; and display information regarding the screen rendering status of the shared information to the moderator of the web conference.

A fifth aspect of the present invention provides computer software embodied in a propagated signal for providing screen rendering status information to a moderator of a web conference, the computer software comprising instructions to cause a computer system to perform the following functions:

provide shared information to at least one participant of the web conference; determine a screen rendering status of the shared information in a web browser of each participant of the web conference; obtain the screen rendering status of the shared information from each participant; and display information regarding the screen rendering status of the shared information to the moderator of the web conference.

BRIEF DESCRIPTION OF THE DRAWINGS

These and other features of this invention will be more readily understood from the following detailed description of the various aspects of the invention taken in conjunction with the accompanying drawings in which:

FIGS. 4-7 depict illustrative visual representations of screen rendering status information provided to a moderator of a web conference in accordance with various embodiments of the present invention.

Figure 1:
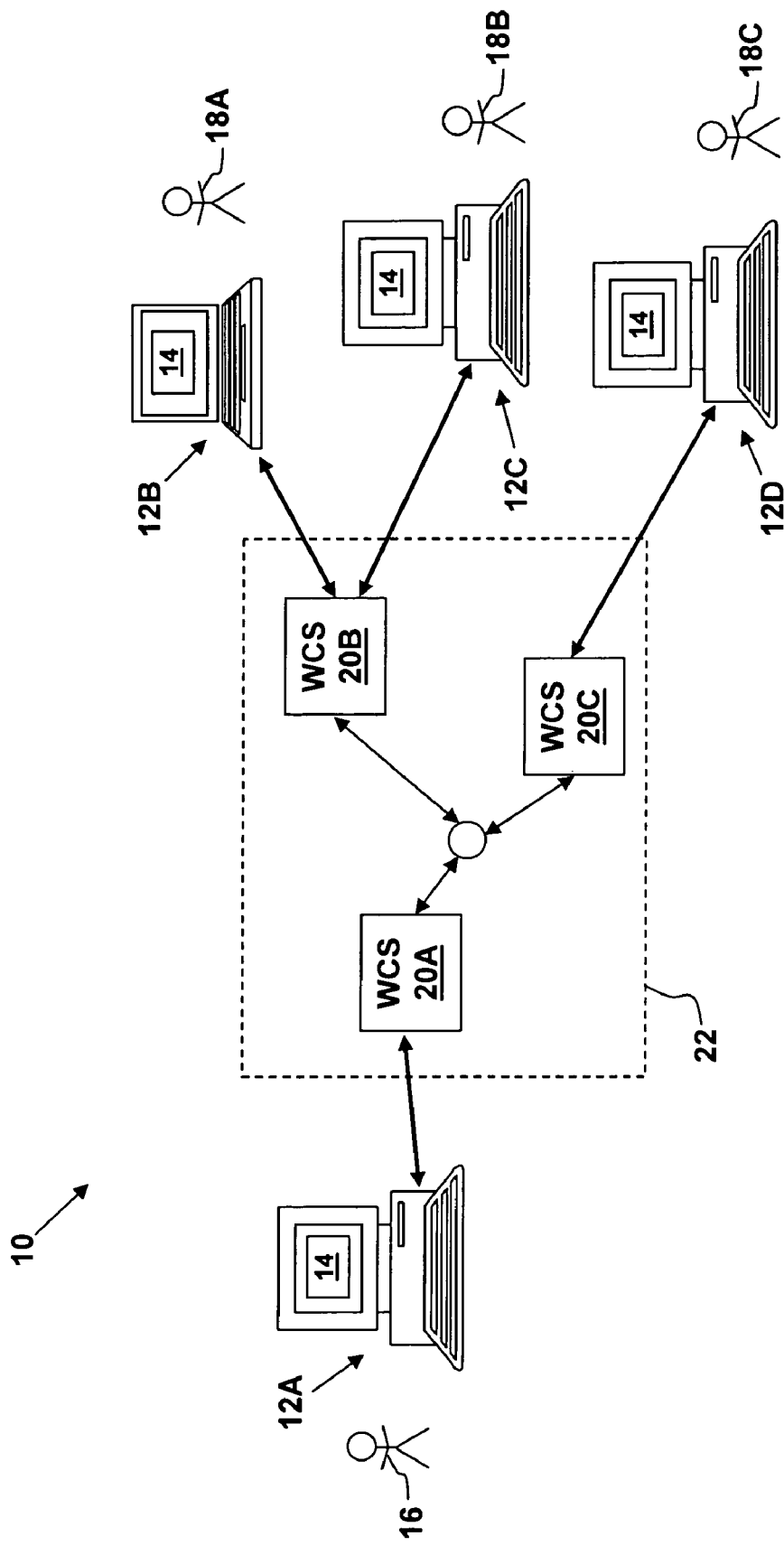
FIG. 1 depicts an illustrative web conferencing system.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Figure 2:
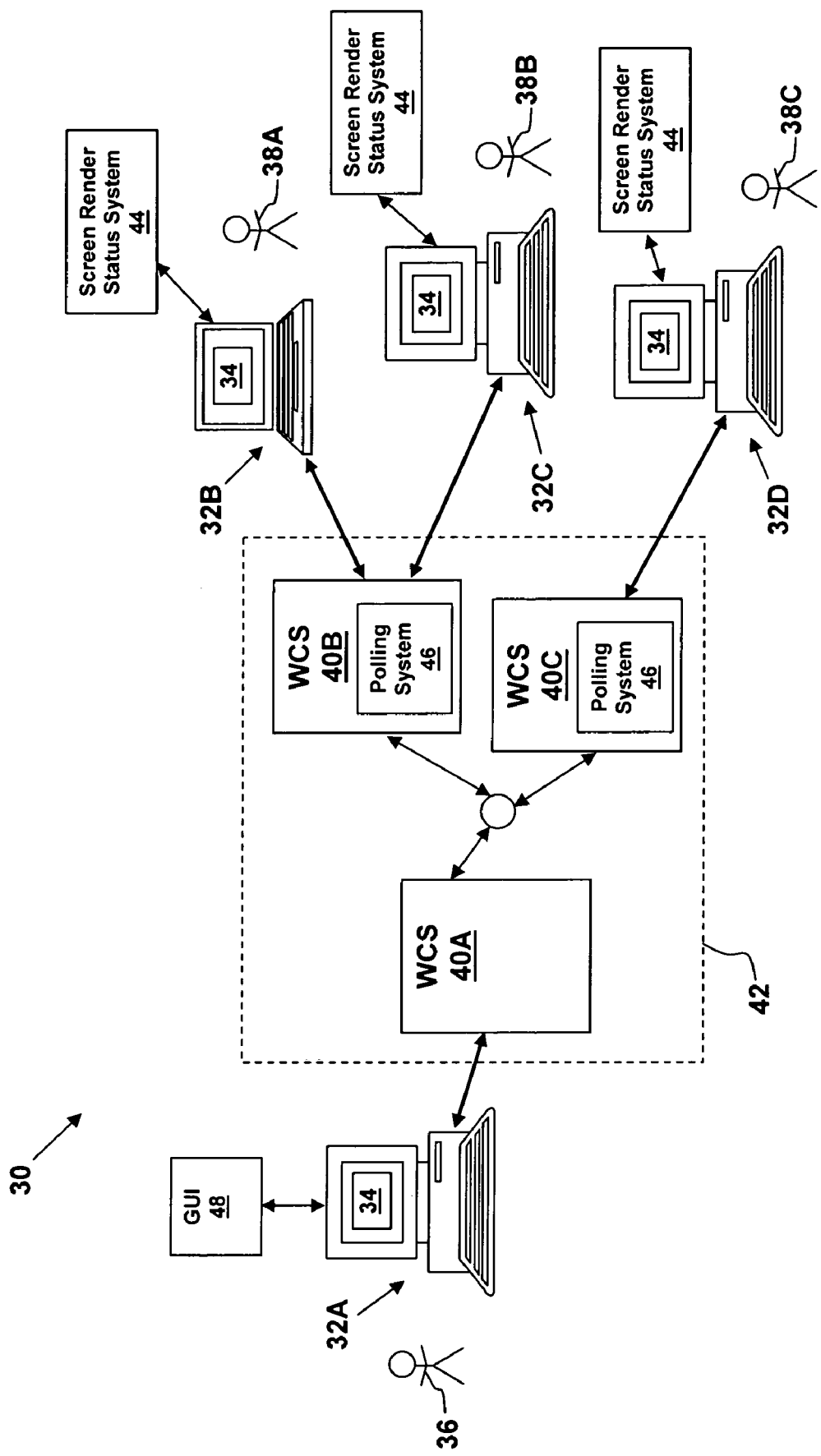
FIG. 2 depicts an illustrative system in accordance with an embodiment of the present invention.

An illustrative web conferencing system 30 in accordance with an embodiment of the present invention is illustrated in FIG. 2. The web conferencing system 30 generally includes a plurality of computing clients 32A-32D, each running a web browser 34, that a moderator 36 and one or more meeting participants 38A-38C use to connect to web conference servers (WCS) 40A-40C in a web conference network 42. In this example, the computing client 32A of the moderator 36 communicates with WCS 40A, the computing clients 32B and 32C of the meeting participants 38A and 38B communicate with WCS 40B, and the commuting client 32D of the meeting participant 38C communicates with WCS 40C. Again, it is possible for the moderator 36 and all meeting participants 38A-38C to be served by a single WCS. Although shown as including three meeting participants 38A-38C, it will be apparent to one skilled in the art that the web conferencing system 30 can include any number of meeting participants.

The computing client 32B-32D of each meeting participant 38A-38C includes a screen render status system 44 for providing a screen rendering status of its browser 34. The screen render status system 44 can be provided as a plug-in to the browser 34, as a stand-alone program, or in any other suitable manner. The screen rendering status of a browser 34 can be indicated in a number of different ways. For example, the screen rendering status may comprise: "Successful," "In Progress," and "Stalled." A percentage of rendering can also be provided (e.g., "90% rendered). Many other types of visual status indicators can also be provided. Other types of indicators (e.g., auditory) can also be used.

WCS 40B-40C each include a polling system 46 for polling the screen render status system 44 of a computing client 32B-32D connected thereto for the screen rendering status of its browser 34. The polling can occur automatically, for example, at a predetermined time (e.g., 5 sec) after the shared content has been sent by the computing client 32A of the moderator 36 to the computing clients 32B-32D of the meeting participants 38A-38C, and can be repeated at predetermined intervals (e.g., every 5 seconds), if desired. Polling can also occur manually, for example, in response to an instruction provided by the moderator 36. The screen rendering status information obtained by each polling system 46 is provided to the computing client 32A of the moderator 36 by the WCS 40A.

The computing client 32A of the moderator 36 also includes a graphical user interface (GUI) 48 for generating and displaying the screen rendering status information received in response to the polling. The GUI 48 can include a variety of moderator-settable options, which allow the moderator 36 to select the type of visual representation provided by the GUI 48. The GUI 48 can be provided as a plug-in to the browser 34 running on the computing client 32A of the moderator 36, as a stand-alone program, or in any other suitable manner. The GUI 48 can provide several different views of the screen rendering status information and the moderator 36 can select among those views as needed/desired.

Although not shown, the computing client 32A of the moderator 36 can also include a screen render status system 44. In addition, WCS 40A can include a polling system 46 and the computing clients 32B-32D of the meeting participants 38A-38C can include a GUI 48. In this way, any of the computing clients 32A-32D can act as the moderator of a web conference and can view screen rendering status information provided by the other computing clients.

Figure 3:
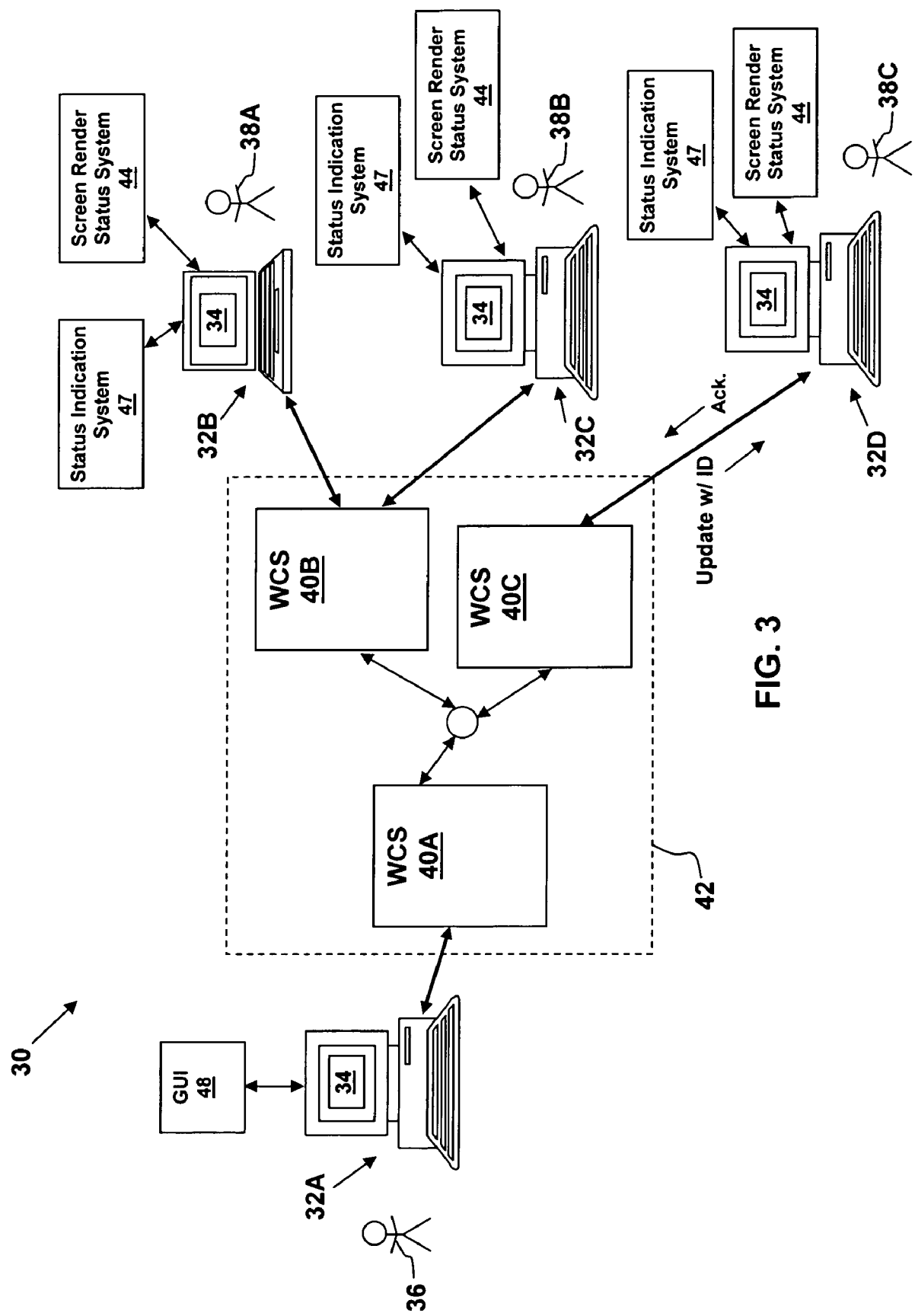
FIG. 3 depicts an illustrative system in accordance with another embodiment of the present invention.

Another embodiment of the web conferencing system 30 is illustrated in FIG. 3. In this embodiment, polling systems 46 are not used to retrieve screen rendering status information from the web browsers 34 running on the computing clients 32B-32D of the meeting participants 38A-38C. Instead, the computing clients 32B-32D of the meeting participants 38A-38C are provided with a status indication system 47 that is configured to send a signal back to a WCS 40B-40C to indicate that the shared information has been successfully rendered by its web browser 34. The status indication system 47 can be provided as a plug-in to the browser 34, as a stand-alone program, or in any other suitable manner. This embodiment of the web conferencing system 30 operates as follows:

(A) For each screen update that a WCS 40B-40C sends to a computing client 32B-32D of a meeting participant 38A-38C during a web conference, an ID is generated and is sent along with the update (e.g., update "X");

(B) When a browser 34 running on the computing client 32B-32D of a meeting participant 38A-38C has completely rendered the update, the status indication system 47 associated with that browser 34 sends an acknowledgement (e.g., update "X" complete) back to the WCS 40B-40C; and (C) The WCS 40B-40C sends screen rendering status information corresponding to the received acknowledgements to the computing client 32A of the moderator 36 via the WCS 40A, where the screen rendering status information can be displayed to the moderator 36 via the GUI 48.

In a web conference comprising a relatively small number of meeting participants, the moderator 36 may choose to have the GUI 48 display the received screen rendering status information in the form of a table, such as the table 50 depicted in FIG. 4, in which the meeting participants and the screen rendering status of their browsers 34 are displayed, organized by meeting participant/location. For example, as shown in FIG. 4, the moderator 36 can easily determine that the screen containing the currently shared data has been successfully rendered by the browsers 34 of the meeting participant "Lyle"

located in "Site A" and the meeting participant "Smith" located in "Site B." Further, the moderator 36 can easily determine that screen rendering is still taking place for the meeting participant "Jones" located in "Site C," while screen rendering has stalled for the meeting participant "Austin" located at "Site D." At a later time (e.g., 5 seconds later), based on new polling information provided by the polling systems 46, the GUI 48 may update the table 50 as shown in FIG. 5. At this point in time, the moderator 36 can easily determine that the currently shared data has been successfully rendered for all of the meeting participants.

For a web conference with a relatively large number of meeting participants, the moderator 36 may choose to have the GUI 48 display the received screen rendering status information using percentages of meeting participants by location. For example, as shown in FIG. 6, the moderator 36 can easily determine that the screen containing the currently shared data has been successfully rendered by the browsers 34 of 100% of the set (e.g., one or more) of meeting participants located in Raleigh, 75% of the set of meeting participants located in Cambridge, and 25% of the set of meeting participants located in Endicott.

Many other techniques can be used to display the screen rendering status information provided by the present invention such that the moderator 36 of a web conference can easily gauge the flow of the meeting, presentation, etc. For example, a chart (e.g., pie chart), a numerical display, etc., could be used. To this extent, the tabular examples presented above are not meant to be limiting in any way.

A set (e.g., one or more) of the meeting participants 38A-38C can be "flagged" for special monitoring during a web conference. This provides a way of prioritizing the web conference. That is, the moderator 36 can have a list of "must have participants" toward which the flow of the meeting, presentation, etc., should be tailored. For example, if the browser 34 of a meeting participant 38A-38C who has been "flagged" for special monitoring has not fully rendered a particular shared screen during a presentation, then the moderator 36 may choose to delay proceeding further with the presentation until the shared screen has been completely rendered.

An example of this type of "flagging" is provided in FIGS. 4 and 5. In particular, as shown in FIGS. 4 and 5, the name of the meeting participant "Jones" has been highlighted (e.g., in bold) to indicate that special monitoring is in effect for that person. As such, the moderator 36 may choose to pay special attention to the screen rendering status of the meeting participant "Jones" when gauging the flow of the web conference. A further example is illustrated in FIG. 7. In particular, of the 300 total participants in the web conference, a total of 20 managers from various sites have been "flagged" as requiring special monitoring. As such, the moderator 36 may choose to pay special attention to the screen rendering status of this group of meeting participants when gauging the flow of the web conference.

Figure 8:
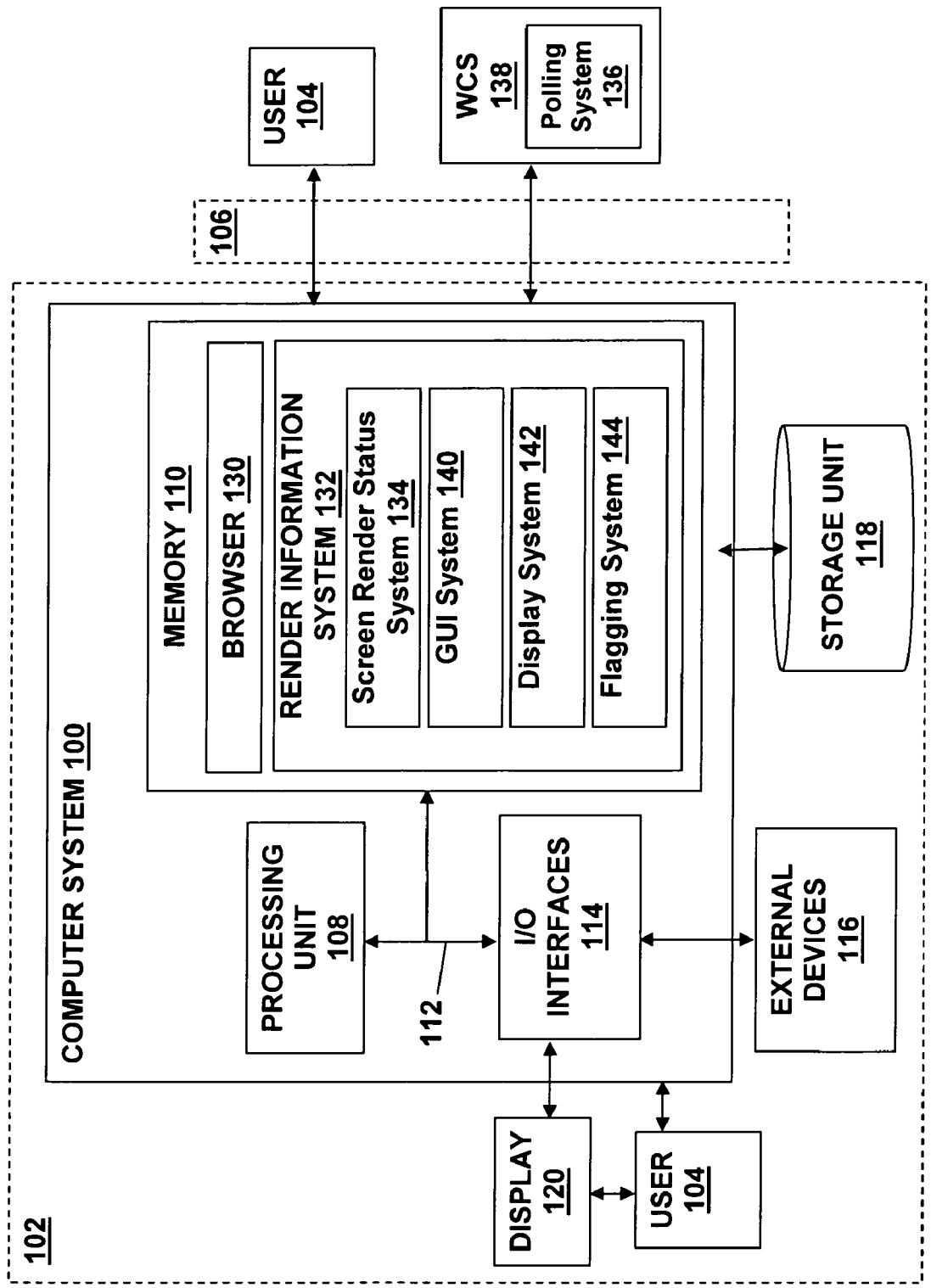
FIG. 8 depicts a computer system for implementing an embodiment of the present invention.

A computer system 100 for implementing an embodiment of the present invention is depicted in FIG. 8. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider. It should be appreciated that a user 104 (e.g., a moderator or meeting participant) can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that may utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage units 118. In general, processing unit 108 executes computer program code, such as browser 130 and render information system 132, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprises two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 may comprise a single processing unit, or can be distributed across one or more processing units in one or more locations, e.g., on a client and server. Similarly, memory 110 and/or storage system 116 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, math co-processor, cache memory, etc.) not shown in FIG. 8 can be included in computer system 100. However, if computer system 100 comprises a handheld device or the like, it is understood that one or more external devices/resources 116 (e.g., a display) and/or one or more storage unit(s) 118 can be contained within computer system 100, and not externally as shown.

Storage system(s) 118 can be any type of system (e.g., a database) capable of providing storage for information under the present invention. Such information can include, for example, screen rendering status information, display templates for displaying the screen rendering status information to a moderator of a web conference, lists of "flagged" meeting participants, etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Although not shown, additional components, such as cache memory, communication systems, system software, etc., may be incorporated into computer system 100. Moreover, although not shown, computer systems operated by user 104 can contain computerized components similar to those described above with regard to computer system 100.

Shown in memory 110 (e.g., as computer program products) are a browser 130 and a render information system 132 in accordance with an embodiment of the present invention. Render information system 132 includes a screen render status system 134 for providing a screen rendering status of the browser 130 in response to polling by a polling system 136 of a WCS 138 (when user 104 is a meeting participant of a web conference) and a GUI system 140 for displaying (e.g., on display 120) the screen rendering status information of meeting participants provided by the WCS 138 (when user 104 is a moderator of a web conference). A display selection system 142 can be provided to allow the user 104 (as moderator) to select a particular type of view of the screen rendering status information polled from the meeting participants of a web conference. A flagging system 144 can also be provided to allow the user 104 (as moderator) to select which, if any, of the meeting participants in a web conference should be "flagged" for special consideration.

The present invention can be offered as a business method on a subscription or fee basis. For example, one or more components of the present invention can be created, maintained, supported, and/or deployed by a service provider that offers the functions described herein for customers.

It should also be understood that the present invention can be realized in hardware, software, a propagated signal, or any combination thereof. Any kind of computer/server system(s)—or other apparatus adapted for carrying out the methods described herein—is suitable. A typical combination of hardware and software can include a general purpose computer system with a computer program that, when loaded and executed, carries out the respective methods described herein. Alternatively, a specific use computer, containing specialized hardware for carrying out one or more of the functional tasks of the invention, can be utilized. The present invention can also be embedded in a computer program product or a propagated signal, which comprises all the respective features enabling the implementation of the methods described herein, and which—when loaded in a computer system—is able to carry out these methods.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, or store the program for use by or in connection with the instruction execution system, apparatus, or device.

The medium can be an electronic, magnetic, optical, electromagnetic, infrared, or semiconductor system (or apparatus or device), or a propagation medium. Examples of a computer-readable medium include a semiconductor or solid state memory, magnetic tape, removable computer diskette, random access memory (RAM), read-only memory (ROM), rigid magnetic disk and optical disk. Current examples of optical disks include a compact disk—read only disk (CD-ROM), a compact disk—read/write disk (CD-R/W), and a digital versatile disk (DVD).

Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method for providing screen rendering status information to a moderator of a web conference, comprising:
   providing shared information to at least one participant of the web conference;
   determining a screen rendering status of the shared information in a web browser of each participant of the web conference, wherein the screen rendering status includes an indication of what percentage of the shared information has rendered on a display of the at least one participant;
   obtaining the screen rendering status of the shared information from each participant;
   determining a percentage of the web browsers belonging to a set of the plurality of participants that have completely rendered the shared information; and
   displaying, to the moderator of the web conference via a graphical user interface (GUI): information regarding the screen rendering status of the shared information and an indicator of the percentage of the web browsers that have completely rendered the shared information.

2. The method of claim 1, wherein the step of obtaining the screen rendering status of the shared information further comprises:
   polling each participant to obtain the screen rendering status of the shared information.

3. The method of claim 2, wherein the polling occurs automatically.

4. The method of claim 2, wherein the polling occurs at a predetermined time after the shared information has been provided.

5. The method of claim 2, further comprising:
   repeating the polling after a predetermined interval.

6. The method of claim 1, wherein the step of obtaining the screen rendering status of the shared information further comprises:
   receiving an acknowledgement generated by each participant whose browser has completely rendered the shared information.

7. The method of claim 6, further comprising:
   providing an identifier associated with the shared information to each participant; and
   returning the identifier with the acknowledgement.

8. The method of claim 6, further comprising:
collecting the acknowledgments; and
providing information regarding the acknowledgements to the moderator of the web conference.

9. The method of claim 1, wherein the GUI displays at least an identity of each participant whose browser has completely rendered the shared information.

10. The method of claim 1, further comprising:
flagging at least one participant of the web conference for special monitoring.

11. The method of claim 10, further comprising:
prioritizing a flow of the web conference based on the screen rendering status of the shared information in the browser of each flagged participant.

12. A system, executed by a processor, for providing screen rendering status information to a moderator of a web conference, comprising:
a system for providing shared information to at least one participant of the web conference;
a system for determining a screen rendering status of the shared information in a web browser of each participant of the web conference, wherein the screen rendering status includes an indication of what percentage of the shared information has rendered on a display of the at least one participant;
a system for obtaining the screen rendering status of the shared information from each participant, wherein the system for obtaining further includes a system for determining a percentage of the web browsers belonging to a set of the plurality of participants that have completely rendered the shared information; and
a system for displaying, to the moderator of the web conference via a graphical user interface (GUI): information regarding the screen rendering status of the shared information and an indicator of the percentage of the web browsers that have completely rendered the shared information.

13. The system of claim 12, wherein the system for obtaining the screen rendering status of the shared information further comprises:
a system for polling each participant to obtain the screen rendering status of the shared information.

14. The system of claim 13, wherein the polling occurs automatically.

15. The system of claim 13, wherein the polling occurs at a predetermined time after the shared information has been provided.

16. The system of claim 13, wherein the polling is repeated after a predetermined interval.

17. The system of claim 12, wherein the system for determining a percentage of the web browsers further comprises:
a system for receiving an acknowledgement generated by each participant whose browser has completely rendered the shared information.

18. The system of claim 17, further comprising:
a system for providing an identifier associated with the shared information to each participant; and
a system for returning the identifier with the acknowledgement.

19. The system of claim 17, further comprising:
a system for collecting the acknowledgments; and
a system for providing information regarding the acknowledgements to the moderator of the web conference.

20. The system of claim 12, wherein the GUI displays at least an identity of each participant whose browser has completely rendered the shared information.

21. The system of claim 12, further comprising:
a system for flagging at least one participant of the web conference for special monitoring.

22. A program product stored on a non-transitory computer readable medium for providing screen rendering status information to a moderator of a web conference, the computer readable medium comprising program code, which when executed on a computer, performs the following steps:
providing shared information to at least one participant of the web conference;
determining a screen rendering status of the shared information in a web browser of each participant of the web conference, wherein the screen rendering status includes an indication of what percentage of the shared information has rendered on a display of the at least one participant;
obtaining the screen rendering status of the shared information from each participant;
determining a percentage of the web browsers belonging to a set of the plurality of participants that have completely rendered the shared information; and
displaying, to the moderator of the web conference via a graphical user interface (GUI): information regarding the screen rendering status of the shared information and an indicator of the percentage of the web browsers that have completely rendered the shared information.

23. The program product of claim 22, wherein the obtaining of the screen rendering status of the shared information further comprises:
polling each participant to obtain the screen rendering status of the shared information.

24. The program product of claim 23, wherein the polling occurs automatically.

25. The program product of claim 23, wherein the polling occurs at a predetermined time after the shared information has been provided.

26. The program product of claim 23, which further performs the following:
repeats the polling after a predetermined interval.

* * * * *